United States Patent
Qian et al.

(10) Patent No.: US 9,537,672 B2
(45) Date of Patent: Jan. 3, 2017

(54) METHOD FOR MANAGING CUSTOMER EDGE DEVICE AUTOMATICALLY AND PE DEVICE

(75) Inventors: Feng Qian, Nanjing (CN); Linda Dunbar, Plano, TX (US); Feng Hu, Shenzhen (CN); Zhusheng Deng, Shenzhen (CN); Huihua Song, Nanjing (CN); Jianfei Yue, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 54 days.

(21) Appl. No.: 13/453,189

(22) Filed: Apr. 23, 2012

(65) Prior Publication Data

US 2012/0263177 A1 Oct. 18, 2012

Related U.S. Application Data

(63) Continuation of application No. PCT/CN2010/077811, filed on Oct. 16, 2010.

(30) Foreign Application Priority Data

Oct. 22, 2009 (CN) .......................... 2009 1 0207573

(51) Int. Cl.
*H04L 12/741* (2013.01)
*H04L 12/46* (2006.01)
(Continued)

(52) U.S. Cl.
CPC ....... *H04L 12/4625* (2013.01); *H04L 12/1836* (2013.01); *H04L 12/4641* (2013.01);
(Continued)

(58) Field of Classification Search
USPC ........................................................ 370/390
See application file for complete search history.

(56) References Cited

U.S. PATENT DOCUMENTS

| 8,392,509 | B1 * | 3/2013 | Klessig ............... H04L 41/0803 370/419 |
| 2006/0153220 | A1 * | 7/2006 | Elie-Dit-Cosaque H04L 12/2697 370/432 |

(Continued)

FOREIGN PATENT DOCUMENTS

| CN | 1909433 A | 2/2007 |
| CN | 101267360 A | 9/2008 |

(Continued)

OTHER PUBLICATIONS

EPO Extended Search Report mailed Jul. 10, 2012, issued in related European Application No. 10824451.8, Huawei Technologies Co., Ltd. (11 pages).

(Continued)

*Primary Examiner* — Jianye Wu
*Assistant Examiner* — Jeff Banthrongsack
(74) *Attorney, Agent, or Firm* — Slater Matsil, LLP

(57) ABSTRACT

A method for managing a customer edge device includes: receiving, by a UNI set in a third-party operator network, an E-LMI packet sent by a VUNI set in a service provider network, where the VUNI is configured to manage a RUNI correlated with an EVC in the third-party operator network; converting, by the UNI, a unicast DMAC address in the E-LMI packet into a multicast DMAC address; and sending, by the UNI, the converted E-LMI packet to a CE device connected with the UNI. The E-LMI packet sent by the VUNI set in a service provider network may penetrate the third-party operator network, so that the management information of the service provider network can be transmitted to the CE device that is connected with the third-party operator network through the UNI.

16 Claims, 6 Drawing Sheets

(51) Int. Cl.
*H04L 12/18* (2006.01)
*H04L 12/26* (2006.01)
*H04L 12/24* (2006.01)

(52) U.S. Cl.
CPC ...... *H04L 41/0686* (2013.01); *H04L 41/0803* (2013.01); *H04L 43/0811* (2013.01); *H04L 43/0817* (2013.01)

(56) References Cited

U.S. PATENT DOCUMENTS

| 2008/0013547 | A1* | 1/2008 | Klessig et al. | 370/395.53 |
| 2009/0154364 | A1* | 6/2009 | Felkar et al. | 370/245 |
| 2010/0246406 | A1* | 9/2010 | Hill et al. | 370/241.1 |
| 2013/0176898 | A1* | 7/2013 | Klessig et al. | 370/254 |

FOREIGN PATENT DOCUMENTS

| CN | 101471813 A | 7/2009 | |
| CN | 102045184 B | 9/2012 | |
| EP | 1596531 A2 * | 11/2005 | |
| EP | 2 053834 A1 | 4/2009 | |
| FR | EP 1596531 A2 * | 11/2005 | H04L 41/0677 |

OTHER PUBLICATIONS

Chiosi et al., Supercomm MEF Global Interconnect In-depth Part 1 Ethernet Network-to-Network Interface (ENNI), Draft Specification Overview and MEF 23: Multi-Provider Class of Service Implementation Options, Metro Ethernet Forum, Oct. 21, 2009 (39 pages).

A.Goldberg, MEF Report: User to Network Interface (UNI), Network-to-Network Interfaces (E-NNI), and Global Interconnection Tools, Metro Ethernet Forum, Feb. 11, 2009 (39 pages).

Cisco, Cisco IOS Software Release 12.2(33)SXI, New Features and Hardware Support, Jul. 2009 (33 pages).

Supercomm 2009 Workshop and Theater, Metro Ethernet Forum, Oct. 21, 2009 (4 pages).

Communication Pursuant to Article 94(3) EPC received in European Application No. 10 824 451.8-1862 mailed Jul. 30, 2013, 7 pages.

International Search Report and Written Opinion of the International Search Authority, issued by the State Intellectual Property Office, the P.R. China in International Application No. PCT/CN2010/077811, mailed Jan. 27, 2011, (7 pages).

"IEEE Standard for Information Technology—Local and Metropolitan Area Networks—Part 3: CSMA/CD Access Method and Physical Layer Specifications Amendment: Media Access Control Parameters, Physical Layers, and Management Parameters for Subscriber Access Networks," IEEE Computer Society, Sep. 7, 2004, 640 pages.

IEEE Standard for Local and Metropolitan Area Networks—Media Access Control (MAC) Bridges and Virtual Bridged Local Area Networks—Amendment 16: Provider Bridging—Remote Customer Service Interfaces, IEEE Computer Society, Sep. 23, 2011, 100 pages.

"IEEE Standard for Local and Metropolitan Area Networks—Virtual Bridged Local Area Networks; Amendment 5: Connectivity Fault Management," IEEE Computer Society, Dec. 17, 2007, 260 pages.

"Series Q: Switching and Signaling; Digital Subscriber Signalling System No. 1—Network Layer," ITU-T Telecommunication Standardization Sector of ITU, Q.933, Feb. 2003, 46 pages.

"Series X: Data Networks and Open System Communications; Public Data Networks-Interfaces," ITU-T Telecommunication Standardization Sector of ITU, X.36, Feb. 2003, 158 pages.

"Series Y: Global Information Infrastructure, Internet Protocol Aspects and Next-Generation Networks; Internet Protocol Aspects0 Operation, Administration and Maintenance," ITU-T Telecommunication Standardization Sector of ITU, Y.1731, May 2006, 80 pages.

* cited by examiner

METHOD FOR MANAGING CUSTOMER EDGE DEVICE AUTOMATICALLY AND PE DEVICE

CROSS-REFERENCE TO RELATED APPLICATIONS

This application is a continuation of International Application No. PCT/CN2010/077811, filed on Oct. 16, 2010, which claims priority to Chinese Patent Application No. 200910207573.0, filed on Oct. 22, 2009, both of which are hereby incorporated by reference in their entireties.

FIELD OF THE INVENTION

Embodiments of the present invention relates to the field of network technologies, and in particular, to a method for managing a customer edge (Customer Edge (CE)) device automatically and a provider edge (Provider Edge (PE)) device.

BACKGROUND OF THE INVENTION

Metro Ethernet Forum (MEF) is a nonprofit organization that specializes in solving metropolitan Ethernet technology problems. It aims to expedite Ethernet standardization, and uses the Ethernet technology as a switching technology and a transmission technology for constructing metropolitan area networks, solving the problems of the Ethernet, and meeting the requirements of operators for carrying out services, where the problems of the Ethernet are lacking carrier-class Operation Administration and Management (Operation Administration and Management (OAM)) capabilities, lacking end-to-end quality of service (Quality of Service (QoS)) assurance, and so on.

Currently, the MEF has finished phase 1 (Phase $1^{st}$) and phase 2 (Phase $2^{nd}$), and is now developing relevant standards of phase 3 (Phase $3^{rd}$). Phase 3 includes the content such as an external network and network interface (External Network and Network (E-NNI)), a virtual user network interface (Virtual User Network Interface (VUNI)), and a remote user network interface (Remote User Network Interface (RUNI)), and so on.

The network to network interface (Network to Network Interface (NNI)) specification is used to define the operation and administration interface between networks such as operator network and service provider network. Currently, the NNI specification is still under development, and is a focus of research in phase 3.

In the existing NNI specification developed by the MEF, for a service that is performed across a domain. Namely, when a service provider network is connected with a customer edge device through a third-party operator network, a method for managing the CE device automatically is not provided. For example, information such as configuration information or fault information is sent to the CE device.

SUMMARY OF THE INVENTION

Embodiments of the present invention provide a method for managing a CE device automatically and a PE device, which is capable of implementing automatic management for the CE device in a cross-domain service.

An embodiment of the present invention provides a method for managing a customer edge CE device automatically, including:

receiving, by a user network interface UNI set in a third-party operator network, an Ethernet-local management interface E-LMI packet sent by a virtual user network interface VUNI that is set in a service provider network, where the VUNI is configured to manage a remote user network interface RUNI that is correlated with a specific Ethernet virtual connection EVC and is in the third-party operator network;

converting, by the UNI, a unicast destination media access control DMAC address in the E-LMI packet into a multicast DMAC address; and sending, by the UNI, the converted E-LMI packet to a CE device that is connected with the UNI.

An embodiment of the present invention further provides a method for managing a customer edge CE device automatically, including:

setting, by a virtual user network interface VUNI set in a service provider network, a destination media access control DMAC address field in a to-be-sent Ethernet-local correlation interface E-LMI packet to a unicast DMAC address; and sending, by the VUNI, the E-LMI packet where the DMAC address field is set to be the unicast DMAC address to a remote user network interface RUNI in a third-party operator network.

An embodiment of the present invention further provides a method for handling a fault of a remote user network interface RUNI, including:

obtaining, by a virtual user network interface VUNI set in a service provider network, fault information of the RUNI, where the VUNI is configured to manage a RUNI that is correlated with a specific Ethernet virtual connection EVC and is set in a third-party operator network; and sending, by the VUNI, a Connectivity Check Message (CCM) that carries the fault information of the RUNI to each of other provider edge PE devices in the service provider network, so that each of other PE devices send the fault information of the RUNI to a customer edge CE device that is connected with each of other provider edge PE devices.

An embodiment of the present invention further provides a method for handling a fault of a remote user network interface RUNI, including:

receiving, by a provider edge PE device in a service provider network, a connectivity check message CCM that carries fault information of the RUNI, where the CCM is sent by a virtual user network interface VUNI in the service provider network;

obtaining, by the PE device, the fault information of the RUNI from the CCM; and sending, by the PE device, an E-LMI packet to a CE device that is connected with the PE device, where the E-LMI packet carries the fault information of the RUNI.

An embodiment of the present invention further provides a provider edge PE device, which includes a user network interface UNI, and the UNI includes:

a first receiving module, configured to receive an Ethernet-local management interface E-LMI packet sent by a virtual user network interface VUNI that is set in a service provider network, where the VUNI is configured to manage a remote user network interface that is correlated with a specific Ethernet virtual connection EVC in the third-party operator network;

a converting module, configured to convert a unicast destination media access control DMAC address in the E-LMI packet that is received by the first receiving module into a multicast DMAC address; and a first sending module, configured to send the E-LMI packet that is processed by the converting module to a customer edge CE device that is connected with the UNI.

An embodiment of the present invention further provides a provider edge PE device, which includes a virtual user network interface VUNI, and the VUNI includes:

a setting module, configured to set a destination media access control DMAC address field in a to-be-sent Ethernet-local management interface E-LMI packet to a unicast DMAC address; and a second sending module, configured to send the E-LMI packet that is processed by the setting module to a remote user network interface RUNI in a third-party operator network.

An embodiment of the present invention further provides a provider edge PE device, which includes a virtual user network interface VUNI, and the VUNI includes:

a fault detecting module, configured to obtain fault information of a remote user network interface RUNI; and a third sending module, configured to send a connectivity check message CCM that carries the fault information of the RUNI detected by the fault detecting module to each of other PE devices in a service provider network where the provider edge PE device is located, so that each of other PE devices send the fault information of the RUNI to a customer edge CE device that is connected with each of the provider edge PE devices.

An embodiment of the present invention further provides a provider edge PE device, including:

a second receiving module, configured to receive a connectivity check message CCM that is sent by a virtual user network interface VUNI in another provider network PE device in a service provider network, where the CCM carries fault information of a RUNI;

an obtaining module, configured to obtain the fault information of the RUNI from the CCM received by the second receiving module; and a fourth sending module, configured to send an Ethernet-local management interface E-LMI packet that carries the fault information of the RUNI obtained by the obtaining module to a PE device that is connected with the fourth sending module.

An embodiment of the present invention further provides a system for managing a customer edge CE device automatically, which includes the provider edge PE device described above.

An embodiment of the present invention further provides a system for handling a fault of a remote user network interface RUNI, which includes the provider edge PE device described above.

In the embodiments of the present invention, the UNI set in a third-party operator network converts the unicast DMAC address into a multicast DMAC address, where the unicast DMAC address is carried in an E-LMI packet sent by a VUNI that is set in a service provider network. In this way, the E-LMI packet sent by the VUNI that is set in the service provider network may penetrate the third-party operator network, so that the management information of the service provider network can be transmitted to the CE device that is connected with the third-party operator network through the UNI, thereby managing a CE device in the cross-domain service automatically.

BRIEF DESCRIPTION OF THE DRAWINGS

To make the technical solution in the embodiments of the present invention or in the prior art clearer, the following introduces the accompanying drawings for describing the embodiments of the present invention or the prior art briefly. Apparently, the accompanying drawings in the following description are some embodiments of the present invention. For persons of ordinary skill in the art, other drawings may further be obtained according to these drawings without creative efforts.

DETAILED DESCRIPTION OF THE EMBODIMENTS

Figure 1:
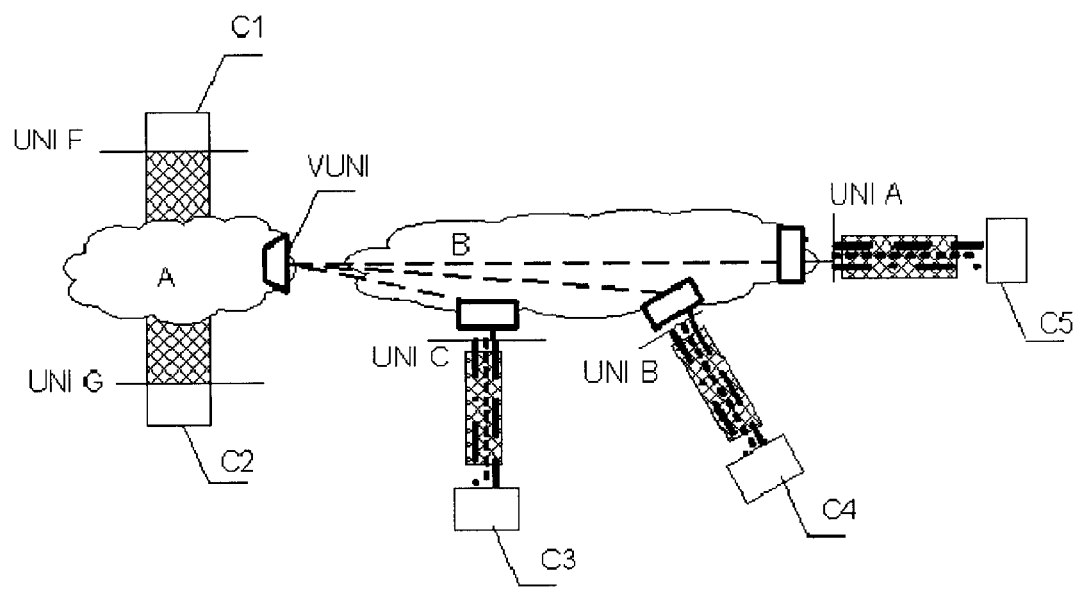
FIG. 1 is a schematic structural diagram of a cross-domain service system according to an embodiment of the present invention.

In order to make objectives, technical solutions and advantages of embodiments of the present invention clearer, the technical solutions in the embodiments of the present invention are clearly and fully described with reference to the accompanying drawings. Apparently, the described embodiments are a part rather than all of the embodiments of the present invention. All other embodiments obtained by persons of ordinary skill in the art based on the embodiments of the present invention without creative efforts shall fall within the protection scope of the present invention.

MEF 11 describes the requirements and framework of the UNI, provides the requirements, framework and functional model for how to operate a UNI reference point in a metro Ethernet network (MEN), gives definitions of the UNI control layer, data layer, and management layer, and pre-defines three types of UNI, respectively, UNI Type 1 (Type 1), UNI Type 2 (Type 2), and UNI Type 3 (Type 3). The parameters of UNI Type 1 are based on manual configuration. UNI Type 2 allows the network device (UNI-N device) to configure user device (UNI-C device) automatically and publish Ethernet virtual connection (Ethernet Virtual Connection (EVC)) information, which are implemented by using an Ethernet-local management interface (Ethernet-Local Management Interface (E-LMI)) and other OAM mechanisms. UNI Type 3 allows the UNI-C device to actively initiate a signaling to the UNI-N device or negotiate with the UNI-N device about the service attributes of the EVC.

The MEF 16 defines an E-LMI protocol. The E-LMI protocol is developed based on ITU-T Q.933, X.36, and other relevant standards, such as Frame Relay Local Management Interface (ER-LMI) protocol developed by the Relay Forum. The E-LMI protocol is mainly used to configure a CE device automatically, so as to support metropolitan Ethernet services. The E-LMI protocol also provides management for UNI and EVC state information of the CE device. The UNI and EVC information may be used to configure the CE device automatically in the metropolitan Ethernet.

The E-LMI protocol has two main functions: (1) Send automatic configuration information to the CE device, including information on mapping between a customer virtual local area network (Customer Virtual Local Area Network, C-VLAN for short) and the EVC, and bandwidth template information; and (2) send EVC information to the CE device, where the EVC information includes the following information:

A. EVC addition information;
B. EVC deletion information;
C. EVC active (active), inactive (not active), and partially active information; and
D. EVC and UNI attribute information.

In the Ethernet OAM protocol stack, Y.1731 and 802.1ag may be regarded as one type, and both protocols implement the end-to-end basic fault management function. The Y.1731 protocol further implements the performance management function on the basis of the 802.1 ag protocol. Implementation of function (2) of the E-LMI protocol depends on the 802.1 ag protocol. In the Ethernet OAM protocol stack, 802.3ah is developed to solve the last-mile OAM problem, and mainly used to detect a link between a CE device and a provider edge (Provider Edge (PE)) device. The E-LMI protocol complements the 802.3ah protocol mutually. The E-LMI protocol puts forward that the E-LMI protocol does not include the function of detecting and managing the link between the CE device and the PE device, and such a function is mainly implemented by the 802.3ah protocol.

FIG. 1 is a schematic structural diagram of a cross-domain service system according to each embodiment of the present invention. In this system, a first CE device C1 accesses service provider network A through UNI F; a second CE device C2 accesses service provider network A through UNI G; and a third CE device C3 accesses third-party operator network B through UNI C; a fourth CE device C4 accesses third-party operator network B through UNI B; and a fifth CE device C5 accesses third-party operator network B through UNI A. Third-party operator network B provides a pipeline between service provider network A and the remote third CE device C3, the fourth CE device C4, and the fifth CE device C5, and bears an EVC service between service provider network A and the third CE device C3, the fourth CE device C4 and the fifth CE device C5. For service provider network A, UNI C, UNI B, and UNI A are RUNIs. The service provider network may be connected with the RUNI through the VUNI.

The VUNI is deployed in service provider network A. The VUNI is an interface for managing all RUNIs that are related to a certain EVC. The VUNI may be set in a certain PE device of the service provider network. In a cross-domain service system, multiple services may be involved. Some VUNIs and one or more RUNI may form an EVC, and other VUNIs may combine with other one or more RUNIs into another EVC. Therefore, the VUNI needs to be correlated with the RUNI that is related to the VUNI, namely, a corresponding relationship between the VUNI and the RUNI that are correlated with one EVC is set up.

Figure 2:
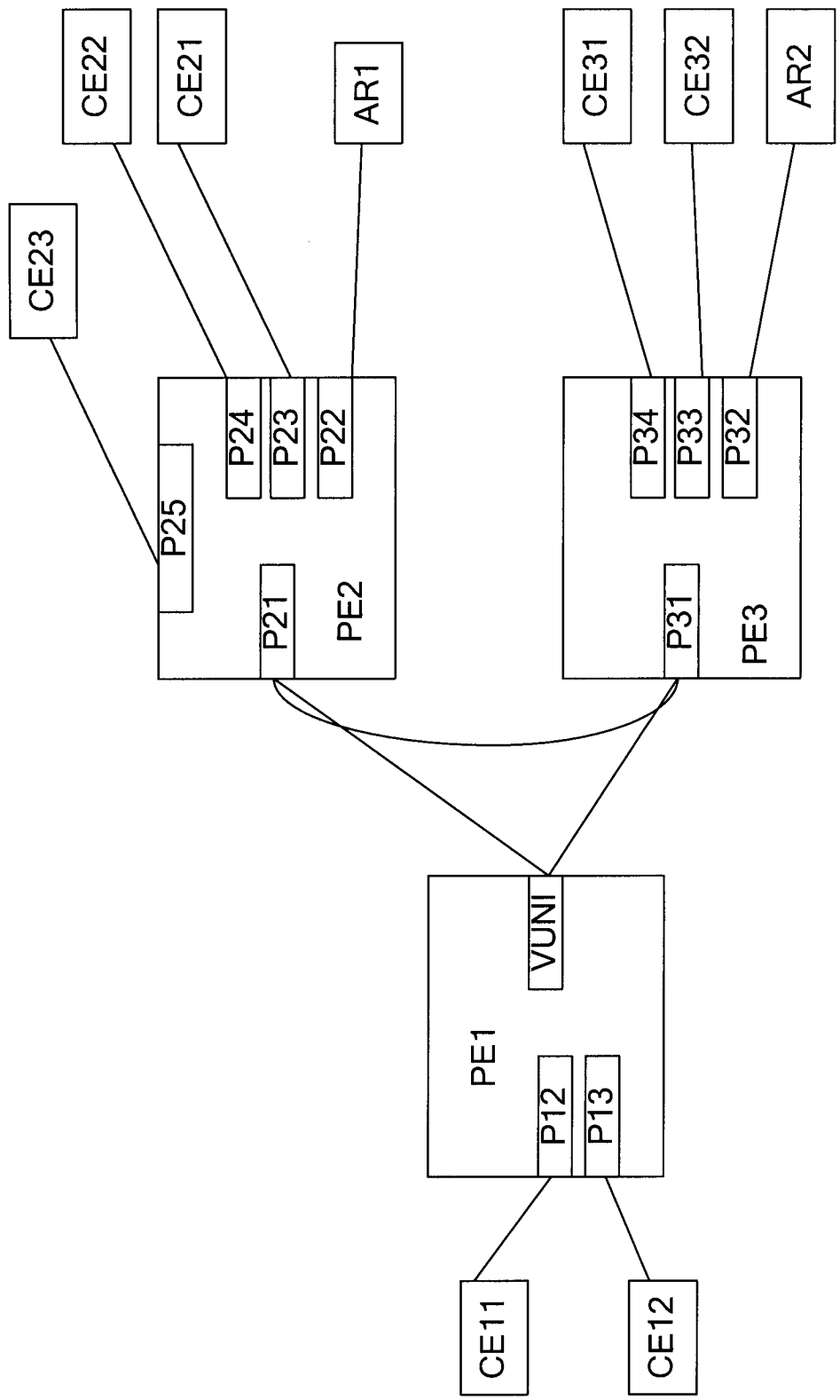
FIG. 2 is a schematic structural diagram of a system according to an embodiment of the present invention.

FIG. 2 is a schematic structural diagram of a system according to an embodiment of the present invention. In this system, the second port P12 of the PE device PE1 is connected with the CE device CE11; the third port P13 of the PE device PE1 is connected with the CE device CPE12; the second port P22 of the PE device PE2 is connected with an access router (Access Router, AR for short) AR1; the third port P23 of the PE device PE2 is connected with the CE device CE21; the fourth port P24 of the PE device PE2 is connected with the CE device CE22; the fifth port P25 of the PE device PE2 is connected with the CE device CE23; the second port P32 of the PE device PE3 is connected with AR2; the third port P33 of the PE device PE3 is connected with the CE device CE32; and the fourth port P34 of the PE device PE3 is connected with the CE device CE31.

In FIG. 2, it is assumed that the interfaces related to a certain service include the second interface P12 and the third interface P13 in the PE device PE1, the third port P23 and the fourth port P24 in the PE device PE2, and the third port P33 and the fourth port P34 in the PE device PE3. All such ports are UNIs, and the EVC may be regarded as being formed by multiple UNIs. Specifically, in FIG. 2, it may be considered that the second interface P12 and the third interface P13 in the PE device PE1, the third port P23 and the fourth port P24 in the PE device PE2, and the third port P33 and the fourth port P34 in the PE device PE3 form an EVC such as the first EVC. It is assumed that PE1 is located in the service provider network, and the PE device PE2 and the PE device PE3 are located in a third-party operator network. A VUNI may be deployed in the PE device PE1, and the VUNI is used to manage all RUNIs that are correlated with the first EVC. Because the VUNI is set in the PE device PE1 and the PE device PE1 belongs to the service provider network, the third port P23 and the fourth port P24 in the PE device PE2 as well as the third port P33 and the fourth port P34 in the PE device PE3 are RUNIs for the VUNI.

In FIG. 2, the VUNI may manage a RUNI correlated with an EVC. That is, a mapping relationship exists between the VUNI and the RUNI correlated with an EVC; the VUNI may also manage the UNIs correlated with the EVC in the PE where the VUNI is located. For example, the EVC correlated with the VUNI includes the second port P12 and the third port P13 in the PE device PE1, and therefore, the VUNI may also set up a correlation relationship with the second port P12 and the third port P13. The VUNI in the embodiment of the present invention can manage the RUNI correlated with the EVC, and can also manage the UNIs correlated with the EVC in the PE device where the VUNI is located. In FIG. 1, the VUNI is deployed in service provider network A. For example, a VUNI is deployed on a certain PE device in service provider network A; UNI A, UNI B, and UNI C in the third-party operator network B are RUNIs for the VUNI; if a certain specific EVC includes UNI A, UNI B, and UNI C, UNI A, UNI B, and UNI C may be regarded as RUNIs that have a mapping relationship with the VUNI and are managed by the VUNI. In the embodiment of the present invention, it is assumed that a certain specific EVC includes UNI A, UNI B, and UNI C.

In the VUNI, the attribute information of each RUNI may be stored, such as the ID of each RUNI; and the virtual local area network (Virtual Local Area Network (VLAN)) of the CE device connected with each RUNI, and bandwidth of the CE device connected with each RUNI, and so on. The VUNI attribute information includes a receiving and transmitting bandwidth attribute, a maximum transmission unit (Maximum Transmission Unit (MTU)), and an identifier.

Figure 3:
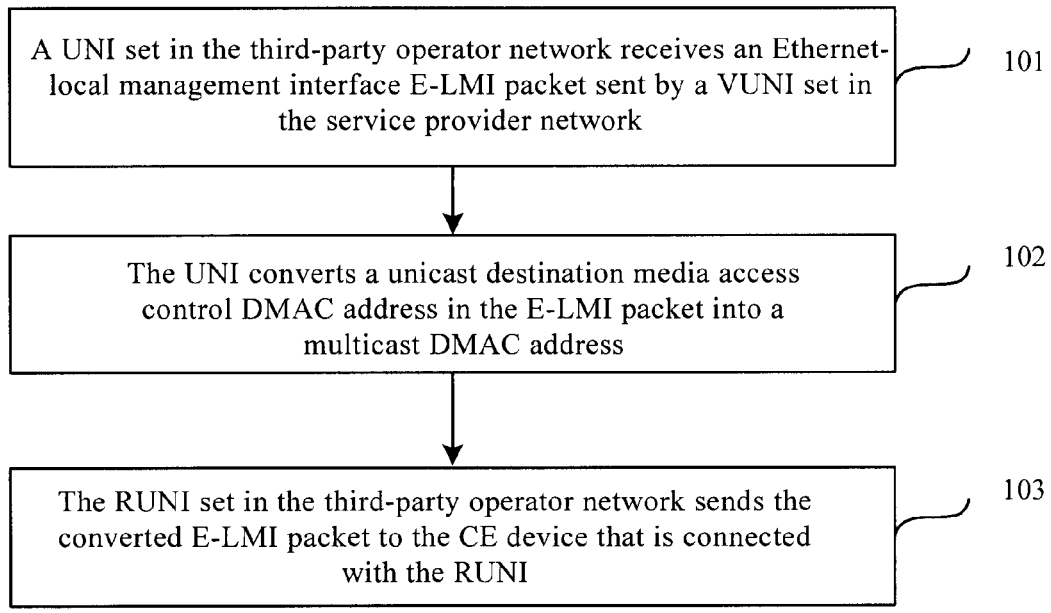
FIG. 3 is a flowchart of a method for managing a CE device automatically according to a first embodiment of the present invention.

FIG. 3 is a flowchart of a method for managing a CE device automatically according to a first embodiment of the present invention, which includes the following:

Step 101: A UNI set in a third-party operator network receives an Ethernet-local management interface E-LMI packet sent by a VUNI that is set in a service provider network, where the VUNI is configured to manage a remote user network interface RUNI that is correlated with a specific EVC in the third-party operator network.

Step 102: The UNI converts the unicast destination media access control DMAC address in the E-LMI packet into a multicast DMAC address.

Step 103: The RUNI set in the third-party operator network sends the converted E-LMI packet to the CE device that is connected with the RUNI.

The system structure shown in FIG. 1 is taken as an example. UNI A in third-party operator network B receives an E-LMI packet sent by the VUNI in service provider network A, and converts the unicast DMAC address in the E-LMI packet into a multicast DMAC address. In this way, the third-party operator network can transmit the E-LMI packet transparently, and then UNI A sends the E-LMI packet to a fifth CE device C5 that is connected with UNI A. The E-LMI packet may carry management information, such as configuration information and fault information, which are used to manage a remote CE device in a cross-domain service system. In this way, the remote CE device can be managed.

Through the method provided by this embodiment, the UNI set in the third-party operator network converts the unicast DMAC address in the E-LMI packet sent by the VUNI set in the service provider network into a multicast DMAC address. In this way, the E-LMI packet can penetrate the third-party operator network and arrive at the CE device that is connected with the third-party operator network, thereby managing the CE device in the cross-domain service.

In step 102, the UNI set in the third-party operator network may convert the unicast DMAC address in the E-LMI packet into a multicast DMAC address through a network interface device (Network Interface Device, NID for short), where the E-LMI packet carries configuration information and is sent by a VUNI set in the service provider network.

If the E-LMI packet carries fault information of the RUNI that is managed by the VUNI that is set in the service provider network, the fault information of the RUNI that is managed by the VUNI that is set in the service provider network may be carried the sixth octet in the E-LMI packet. Table 1 shows an E-LMI packet format according to the embodiment of the present invention.

TABLE 1

E-LMI packet format according to the embodiment of the present invention

| Bit (bits) | | | | | | | | Octet |
|---|---|---|---|---|---|---|---|---|
| 8 | 7 | 6 | 5 | 4 | 3 | 2 | 1 | (octet) |
| EVC status information element identifier (EVC Status information element identifier) | | | | | | | | 1 |
| Length of EVC status information element (length of EVC Status information element) | | | | | | | | 2 |

TABLE 1-continued

E-LMI packet format according to the embodiment of the present invention

| Bit (bits) | | | | | | | | Octet |
|---|---|---|---|---|---|---|---|---|
| 8 | 7 | 6 | 5 | 4 | 3 | 2 | 1 | (octet) |
| EVC reference ID (EVC Reference ID) | | | | | | | | 3 |
| EVC reference ID (continued) | | | | | | | | 4 |
| EVC status type (EVC Status Type) | | | | | | | | 5 |
| Reserved (Reserved) 0 | Reserved (Reserve) 0 | Partially active (Partially Active) | | Active (Active) | New (New) | | | |
| EVC parameter sub-information element (EVC Parameters Sub-information element) | | | | | | | | 6 |
| EVC ID sub-information element (EVC ID Sub-information element) | | | | | | | | 7 |
| Bandwidth profile sub-information element (Bandwidth Profile Sub-information element) | | | | | | | | 8 |
| RUNIsummarysub-informationelement(RemoteUNI SummarySub-informationelement) | | | | | | | | |
| RUNIstatussub-informationelement(RUNIStatus Sub-informationelement) | | | | | | | | |

In Table 1, the oblique underlined part is the content extended on the basis of the existing E-LMI packet. In each embodiment of the present invention, RUNI summary sub-information element (RUNI Summary Sub-information element) and RUNI status sub-information element (RUNI Status Sub-information element) are added into the E-LMI packet, and the fault information of the RUNI may be carried through these two information elements.

Table 2 shows the content of the RUNI summary sub-information element (RUNI Summary Sub-information element) in the embodiment of the present invention, and Table 3 shows the content of the RUNI status sub-information element (RUNI Status Sub-information element) in the embodiment of the present invention.

TABLE 2

Content of the RUNI summary sub-information element (RUNI Summary Sub-information element) in the embodiment of the present invention

| Bit (bits) | | | | | | | | Octet |
|---|---|---|---|---|---|---|---|---|
| 8 | 7 | 6 | 5 | 4 | 3 | 2 | 1 | (octet) |
| RUNI summary sub-information element identifier (Remote UNI Summary sub-information element identifier) (0x64) | | | | | | | | 1 |
| Length of RUNI summary sub-information element (Length of Remote UNI Summary Sub-information element) (0x4) | | | | | | | | 2 |
| RUNI configured number (Remote UNI configure Number) | | | | | | | | 3 |
| Number of UNIs in normal status (the number of UNI which status is up) | | | | | | | | 4 |

In Table 2, the value of the RUNI summary sub-information element identifier (Remote UNI Summary sub-information element identifier) is 0x64, and the value of the length of RUNI summary sub-information element (Length of Remote UNI Summary Sub-information element) is 0x4.

TABLE 3

Content of the RUNI status sub-information element
(RUNI Status Sub-information element) in the
embodiment of the present invention

| Bit (bits) | | | | | | | | Octet |
|---|---|---|---|---|---|---|---|---|
| 8 | 7 | 6 | 5 | 4 | 3 | 2 | 1 | (octet) |
| RUNI status sub-information element identifier (Remote UNI Status sub-information element identifier) (0x23) | | | | | | | | 1 |
| Length of RUNI status sub-information element (Length of Remote UNI Status Sub-information element) (increased) | | | | | | | | 2 |
| RUNI status (Remote UNI Status) UNI identifier sub-information element (UNI Identifier Sub-information element) | | | | | | | | |

In Table 3, the value of the RUNI status sub-information element identifier (Remote UNI Status sub-information element identifier) is 0x23; the length of RUNI status sub-information element is increased; and the UNI identifier sub-information element (UNI Identifier Sub-information element) is used to describe a certain UNI. The RUNI status (Remote UNI Status) may describe the status of the RUNI. If the RUNI fails, the RUNI status reflects the failure.

Figure 4:
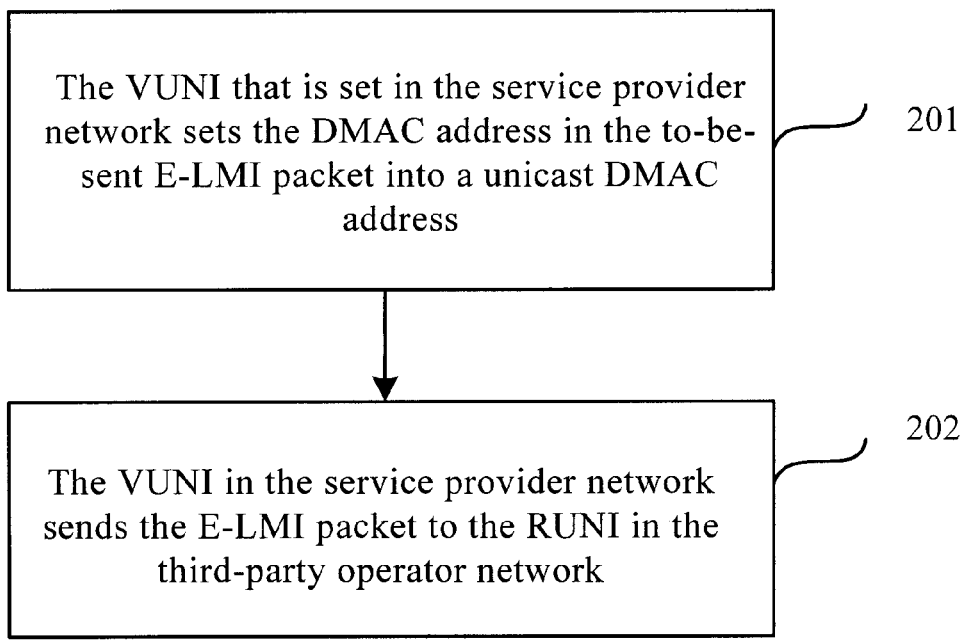
FIG. 4 is a flowchart of a method for managing a CE device automatically according to a second embodiment of the present invention.

FIG. 4 is a flowchart of a method for managing a CE device automatically according to a second embodiment of the present invention, which includes the following:

Step 201: The VUNI set in the service provider network sets the DMAC address field in the to-be-sent E-LMI packet to a unicast DMAC address.

Step 202: The VUNI sends the E-LMI packet to the RUNI in the third-party operator network.

The E-LMI packet may include configuration information or fault information of the RUNI managed by the VUNI that is set in the service provider network.

According to the existing protocol, as regards the multicast DMAC address in the E-LMI packet transmitted between the PE device and the CE device, for the system architecture shown in FIG. 1, if the DMAC in the E-LMI packet sent by the VUNI to each UNI in the third-party operator network is a multicast DMAC address according to the existing protocol, the multicast DMAC address is discarded by the third-party operator network. To prevent the E-LMI packet sent by the VUNI to the RUNI from being discarded, in the second embodiment of the method for managing the CE device automatically, the VUNI sets the DMAC address of the E-LMI packet to a unicast DMAC address first. In this way, after receiving the E-LMI packet, the RUNI does not discard the E-LMI packet. According to the method provided by the first embodiment shown in FIG. 3, the RUNI converts the unicast DMAC address in the received E-LMI packet into a multicast DMAC address, and sends the E-LMI packet to the CE device that is connected with the RUNI. In this way, each CE device may process the E-LMI according to a normal procedure, without a need of adding more functions. For the system shown in FIG. 1, if a certain UNI fails, the entire EVC link is impassable. A method for handling a fault is to bind a maintenance end point (Maintenance End Point ((MEP)) to each port in each PE device. Each UNI has a MEP for detecting the UNI fault. Once a certain UNI fails, the MEP that is bound to the UNI sends a connectivity check message (Connectivity Check Message (CCM)) that carries a RDI to all remote PE devices that is correlated with the EVC. After receiving the CCM that carries the RDI, a remote PE device sends the CCM that carries the RDI to every MEP that is included by the remote PE device and is bound to each UNI. Such a method for handling a fault requires that each port in each PE device should be bound to a MEP, and the cost is high. Moreover, once a certain UNI fails, all MEPs in the entire the system receives a RDI, but cannot know which UNI fails exactly.

Figure 5:
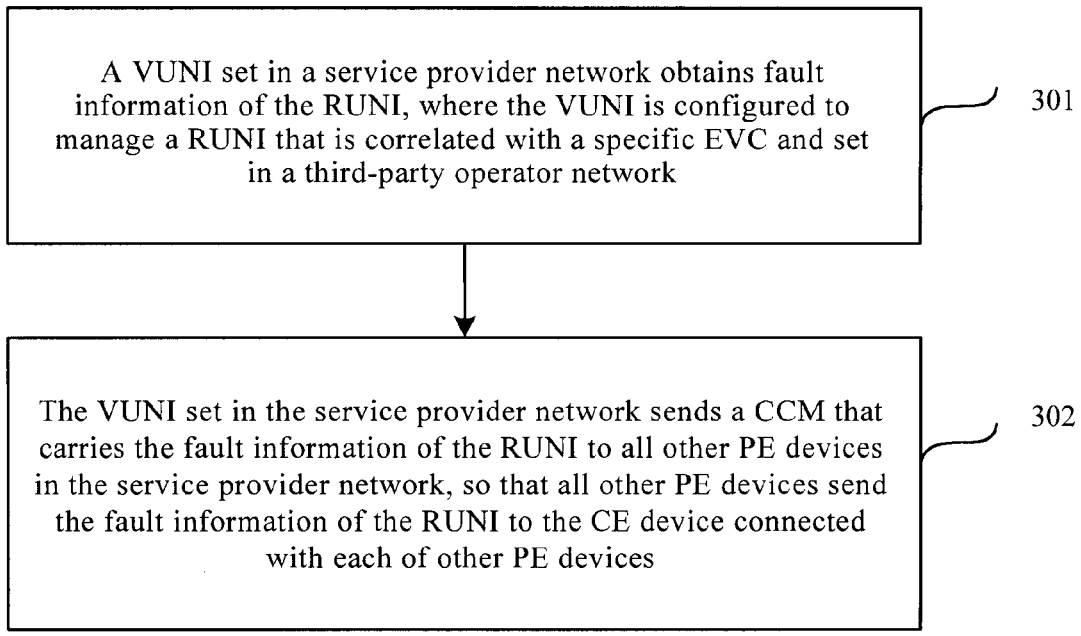
FIG. 5 is a flowchart of a method for handling a fault of a RUNI according to a first embodiment of the present invention.

FIG. 5 is a flowchart of a method for handling a fault of a RUNI according to a first embodiment of the present invention, which includes the following:

Step 301: A VUNI set in a service provider network obtains fault information of the RUNI, where the VUNI is configured to manage a RUNI that is correlated with a specific EVC and is set in a third-party operator network.

Step 302: The VUNI sends a CCM that carries the fault information of the RUNI to each of other PE devices in the service provider network, so that each of other PE devices send the fault information of the RUNI to a CE device that is connected with each of other PE devices.

Generally, the fault seldom occurs between ports inside a PE device. Therefore, it is not necessary to bind a MEP to each UNI in the PE device. In the first embodiment of a method for handling a fault of a RUNI, the VUNI set in the service provider network is used to obtain the fault information of the RUNI. The VUNI is correlated with a specific EVC. Once a certain RUNI managed by the VUNI fails, the VUNI may detect the fault. In this way, the number of apparatuses for detecting the UNI fault may be reduced, thereby reducing the cost. Moreover, in the first embodiment of a method for handling a fault of a RUNI, after detecting that a certain RUNI fails, the VUNI sends a CCM that carries the fault information to other PE devices in the service provider network where the VUNI is located, so that other PE devices send the fault information to the CE devices that are connected with the PE devices respectively. In this way, both the PE device and the CE device can know which RUNI fails exactly, so that the RUNI fault is handled. After obtaining the fault information of the RUNI, each CE may update the topology of the system. The fault information sent by the VUNI may include such information as a RUNI ID and a detailed fault type.

The CCM packet may be transmitted between PE devices. According to an existing protocol, an E-LMI packet rather than a CCM packet can be transmitted between the PE device and the CE device. Therefore, the fault information of the RUNI may be carried in the CCM. Specifically, the fault information may be carried in an interface TLV of the CCM. Table 4 and Table 5 show two structures of the CCM according to the embodiments of the present invention.

TABLE 4

One structure of the CCM according to the
embodiments of the present invention

| TLV type = interface TLV (Interface TLV) | Length (Length) | Interface status (Interface status) | ID subtype: 1 octet (Octet) | Interface ID (1 < n < 32 octets) |
|---|---|---|---|---|

In Table 4, the TLV type and the length field are the header of the interface TLV in the 802.1 ag protocol; the interface status field indicates the interface status in the 802.1 ag protocol; and the ID subtype field and the interface ID field are newly added fields in this embodiment, where the fields are interface identifiers. The fault information of the RUNI may be carried through the newly added fields.

The TLV types in Table 4 include but are not limited to: EVC ID, UNI ID, and PROPERITARY ID.

It is considered that if too many RUNIs exist, the packet shown in Table 4 cannot carry fault information of all RUNIs at a time. The fault information of as many RUNIs as possible may be sent through bit mapping. A specific packet format is shown in Table 5.

TABLE 5

Another structure of the CCM according to the embodiments of the present invention

| TLV type = interface TLV (Interface TLV) | Length (Length) | Interface status bit map (Interface status bit map) |
|---|---|---|

In Table 5, the interface status bit map (Interface status bit map) field is the content extended on the basis of the existing CCM packet in this embodiment. In this field, a bit may be used to indicate a fault of a certain port, for example, the highest bit of the interface bit map field is set to 1 to indicate that the RUNI with the ID "1" fails.

If the fault information of all RUNIs cannot be carried in one CCM packet, the CCM packet may be divided into multiple packets, and the multiple packets are sent separately.

In the embodiment shown in FIG. 5, in the service provider network, other PE devices except the PE device where the VUNI is located need to send a CCM that carries the fault information of the RUNI, and the PE device where the VUNI is located also needs to send a CCM that carries the fault information of the RUNI to the CE device that is connected with the VUNI. In this way, the CE device connected with the VUNI can obtain the fault information of the RUNI.

Figure 6:
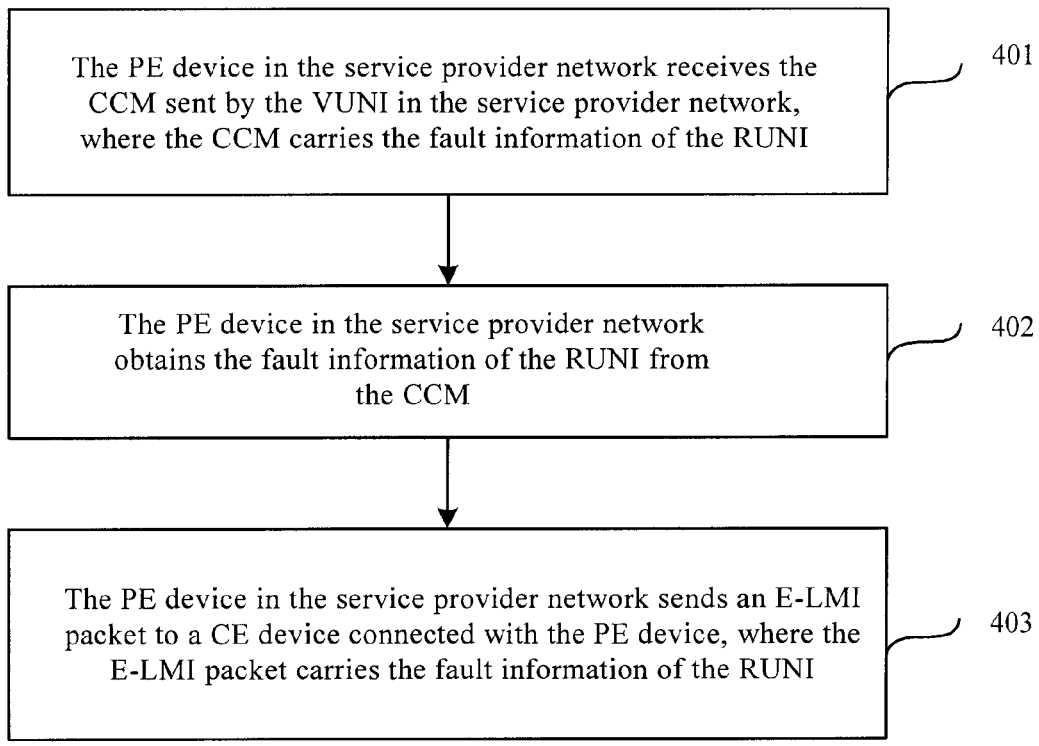
FIG. 6 is a flowchart of a method for handling a fault of a RUNI according to a second embodiment of the present invention.

FIG. 6 is a flowchart of a method for handling a fault of a RUNI according to a second embodiment of the present invention, which includes the following:

Step 401: The PE device in the service provider network receives the CCM sent by the VUNI in the service provider network, where the CCM carries the fault information of the RUNI.

Step 402: The PE device in the service provider network obtains the fault information of the RUNI from the CCM.

Step 403: The PE device in the service provider network sends an E-LMI packet to a CE device that is connected with the PE device, where the E-LMI packet carries the fault information of the RUNI.

In the second embodiment of a method for handling a fault of a RUNI, the PE device sends an E-LMI packet that carries the fault information of the RUNI to the CE device connected with the PE device, and in this way, the CE device can know the fault information of the RUNI and thereby, may update the topology of the system.

The methods shown in FIG. 5 or FIG. 6 may combine with the method shown in FIG. 4 to form a technical solution. This technical solution may enable the E-LMI packet to penetrate the third-party operator network, and manage the remote CE device, and handle the fault information of the RUNI, so that the CE device can know which RUNI fails exactly.

Figure 7:
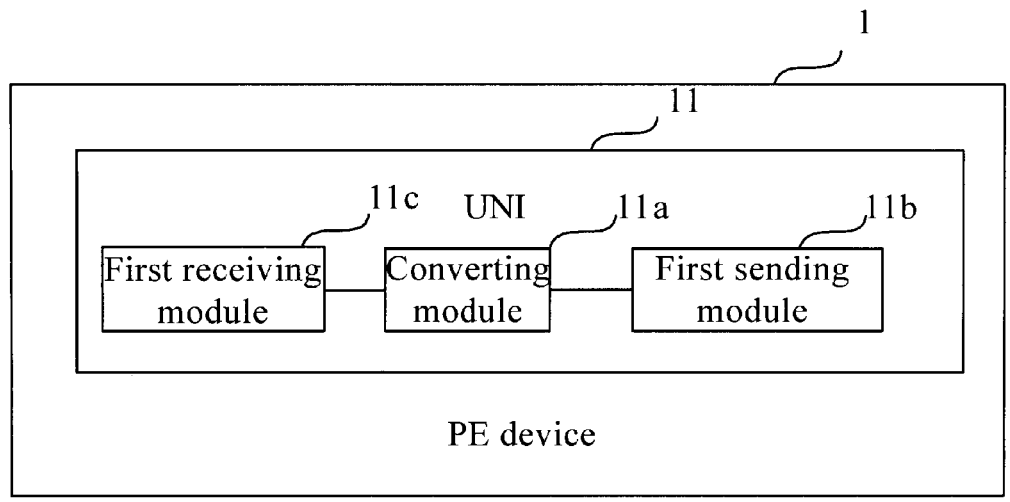
FIG. 7 is a schematic structural diagram of a PE device according to a first embodiment of the present invention.

FIG. 7 is a schematic structural diagram of a PE device according to a first embodiment of the present invention. The PE device 1 includes UNI 11. The UNI 11 includes a first receiving module 11c, a converting module 11a, and a first sending module 11b. The first receiving module 11c is configured to receive an Ethernet-local management interface E-LMI packet sent by a virtual user network interface VUNI that is set in a service provider network, where the VUNI is configured to manage a remote user network interface that is correlated with a specific Ethernet virtual connection EVC in a third-party operator network; the converting module 11a is configured to convert a unicast destination media access control DMAC address in the E-LMI packet received by the first receiving module 11c into a multicast DMAC address; and the first sending module 11b is configured to send the E-LMI packet that is processed by the converting module 11a to a CE device connected with the UNI 11.

The converting module 11a may be a network interface device (Network Interface Device (NID)). The NID is a device embedded in the UNI 11. The NID has a function of converting a unicast DMAC address into a multicast DMAC address; the NID may further monitor the connectivity between the NID and the VUNI, send the EVC information to the CE device, and may further support other measurement functions, such as throughput measurement and service level agreement (Service Level Agreement (SLA)) monitoring.

The PE shown in FIG. 7 may be set in a third-party operator network.

Figure 8:
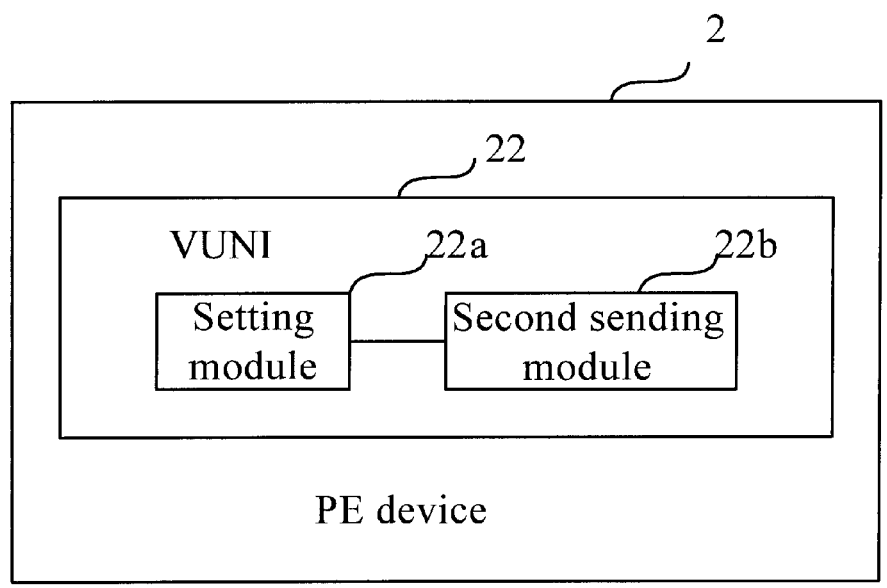
FIG. 8 is a schematic structural diagram of a PE device according to a second embodiment of the present invention.

FIG. 8 is a schematic structural diagram of a PE device according to a second embodiment of the present invention. The PE device 2 includes a VUNI 22. The VUNI 22 includes a setting module 22a and a second sending module 22b. The setting module 22 is configured to set a DMAC address in the to-be-sent E-LMI packet to a unicast DMAC address; and the second sending module 22b is configured to send the E-LMI packet that is processed by the setting module to an RUNI in a third-party operator network.

The PE device shown in FIG. 8 may be set in a service provider network.

Figure 9:
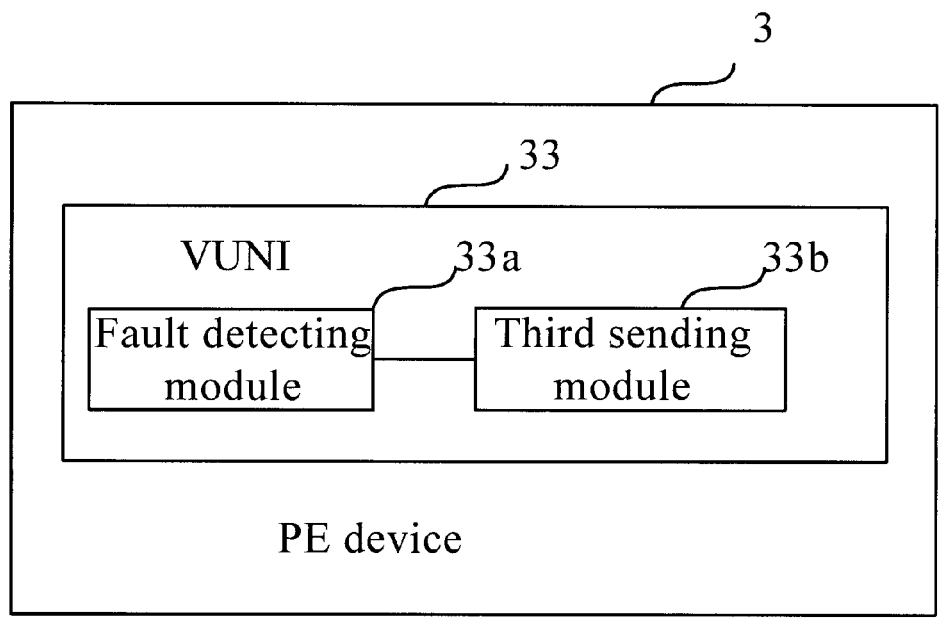
FIG. 9 is a schematic structural diagram of a PE device according to a third embodiment of the present invention.

FIG. 9 is a schematic structural diagram of a PE device according to a third embodiment of the present invention. The PE device 3 includes a VUNI 33. The VUNI 33 includes a fault detecting module 33a and a third sending module 33b. The fault detecting module 33a is configured to obtain fault information of the RUNI; and the third sending module 33b is configured to send the CCM that carries the fault information of the RUNI detected by the fault detecting module 22a to each of other PEs in the service provider network where the PE device 3 is located, so that each of other PEs send the fault information of the RUNI to a CE device that is connected with each of other PE devices.

The third sending module 33b is further configured to send an E-LMI packet that carries the fault information of the RUNI detected by the fault detecting module to a CE device that is connected with the PE device 3.

After the third sending module 33b sends the E-LMI packet that carries the fault information of the RUNI to the CE device connected with the PE device 3, the PE device may update the topology according to the fault information of the RUNI.

The third sending module 33b is further configured to send the E-LMI packet to the RUNI that is managed by the VUNI set in the third-party operator network, where the E-LMI packet carries the fault information of the RUNI detected by the fault detecting module 33a.

Figure 10:
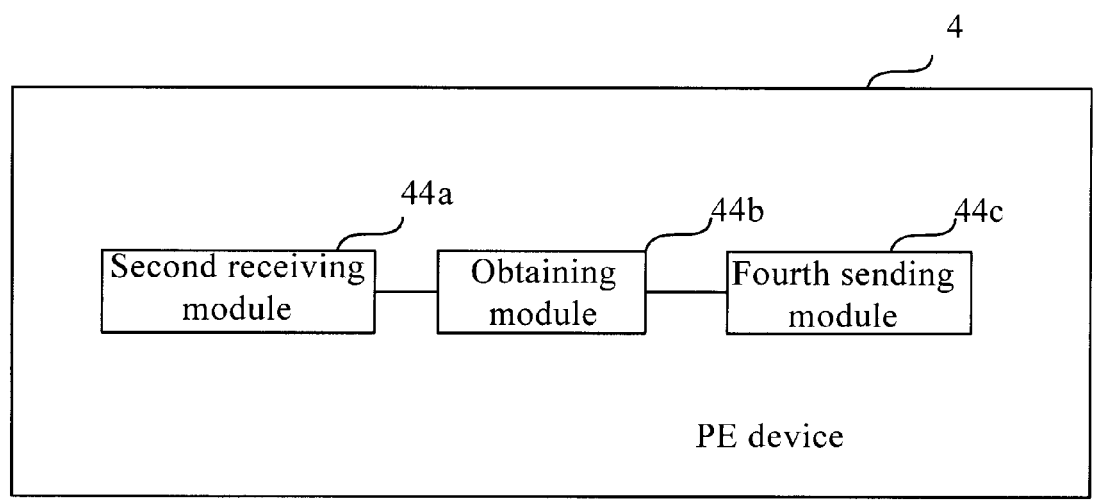
FIG. 10 is a schematic structural diagram of a PE device according to a fourth embodiment of the present invention.

FIG. 10 is a schematic structural diagram of a PE device according to a fourth embodiment of the present invention. The PE device 4 includes a second receiving module 44a, an obtaining module 44b, and a fourth sending module 44c. The second receiving module 44a is configured to receive a CCM sent by the VUNI in other PE devices in the service provider network, where the CCM carries the fault information of the RUNI; the obtaining module 44b is configured to obtain the fault information of the RUNI from the CCM that is received from the second receiving module 44a; and the third sending module 44c is configured to send the E-LMI packet that carries the fault information of the RUNI obtained by the obtaining module 44b to a PE device that is connected with the third sending module.

An embodiment of the present invention further provides a system for managing CE devices automatically, which may include the PE devices shown in FIG. 7 and FIG. 8, where the first sending module 11b is connected with the setting module 22a.

An embodiment of the present invention further provides a system for handling a fault of a RUNI, which may include the PE devices shown in FIG. 9 and FIG. 10, where the third sending module 33b is connected with the receiving module 44a.

The PE devices shown in FIG. 7, FIG. 8, FIG. 9, and FIG. 10 may also be combined together to form a system. The system may configure the remote CE device, and may also handle the fault information of the RUNI.

Persons of ordinary skill in the art may understand that: all or a part of the steps of the method according to the embodiments of the present invention may be implemented by a program instructing relevant hardware. The program may be stored in computer readable storage media. When the program is run, the steps in the foregoing method embodiments are performed. The storage media may be any media capable of storing program codes, such as a ROM, a RAM, a magnetic disk, or an optical disk, and so on.

Finally, it should be noted that, the above embodiments are merely provided for describing the technical solutions of the present invention, but not intended to limit the present invention. Persons of ordinary skill in the art may understand that, although the present invention has been described in detail with reference to the foregoing embodiments, modifications may still be made to the technical solutions of the foregoing embodiments, or equivalent substitutions may be made to a part of technical features of the technical solutions, and these modifications and substitutions do not cause the essence of the corresponding technical solutions to depart from the spirit and scope of each embodiment of the present invention.

What is claimed is:

1. A method comprising:
receiving, by a user network interface (UNI) in a third-party operator network, an Ethernet-local management interface (E-LMI) packet, wherein the E-LMI packet is sent by a virtual user network interface (VUNI) in a service provider network, and a destination media access control (DMAC) address of the E-LMI packet is a unicast DMAC address;
converting, by the UNI, the unicast DMAC address in the E-LMI packet into a multicast DMAC address through a network interface device, wherein the third-party operator network provides a pipeline between the service provider network and a customer edge (CE) device in a customer network, the third-party operator network being separate and distinct from both the service provider network and the customer network; and
sending, by the UNI, the converted E-LMI packet to the CE device that is connected with a remote user network interface (RUNI) through the RUNI in the third-party operator network;
wherein the VUNI is configured to manage the RUNI, the RUNI being correlated with a specific Ethernet virtual connection (EVC) in the third-party operator network;
wherein the E-LMI packet carries configuration information or fault information of the RUNI; and wherein, when the E-LMI packet carries the fault information of the RUNI, the E-LMI packet comprises a RUNI summary sub-information element field and a RUNI status sub-information element field.

2. The method according to claim 1, wherein the RUNI summary sub-information element field comprises a RUNI summary sub-information element identifier field, a length field of the RUNI summary sub-information element field, a RUNI number field, and a field indicating number of UNIs in a normal status; and the RUNI status sub-information element field comprises a RUNI status sub-information element identifier field, a length field of the RUNI status sub-information element field, a RUNI status field, and a UNI identifier sub-information element field.

3. A method comprising:
setting, by a virtual user network interface (VUNI) in a service provider network, a destination media access control (DMAC) address field in an Ethernet-local management interface (E-LMI) packet to a unicast DMAC address; and
sending, by the VUNI, the E-LMI packet to a remote user network interface (RUNI) in a third-party operator network through a user network interface (UNI) in the third-party operator network, wherein sending the E-LMI packet carrying the unicast DMAC address to the RUNI prompts the RUNI to convert the unicast DMAC address to a multicast DMAC address through a network interface device, and to forward the E-LMI packet carrying the multicast DMAC address to a customer edge (CE) device in a customer network, and wherein the third-party operator network provides a pipeline between the service provider network and the CE device in the customer network, the third-party operator network being separate and distinct from both the service provider network and the customer network;
wherein the VUNI is configured to manage the RUNI, the RUNI being correlated with a specific Ethernet virtual connection (EVC) in the third-party operator network;
wherein the E-LMI packet carries configuration information or fault information of the RUNI; and
wherein, when the E-LMI packet carries fault information of the RUNI, the E-LMI packet comprises a RUNI summary sub-information element field and a RUNI status sub-information element field.

4. The method according to claim 3, further comprising: obtaining, by the VUNI, the fault information of the RUNI; and sending, by the VUNI, a Connectivity Check Message (CCM) that carries the fault information of the RUNI to other provider edge (PE) devices in the service provider network, so that the other PE devices send the fault information of the RUNI to the CE device that is connected with each of the other PE devices; and sending, by the PE device wherein the VUNI is located, a CCM that carries the fault information of the RUNI to the CE device connected with the VUNI.

5. The method according to claim 4, wherein the fault information is carried in an interface type length value (TLV) of the CCM, and wherein the CCM comprises an ID subtype field and an interface ID field, or the CCM comprises an interface status bit map field, and a bit of the interface status bit map field represents a port.

6. A provider edge (PE) device comprising:
at least one processor adapted to function as a user network interface (UNI), wherein the PE device is located in a third-party operator network, wherein a service provider network is connected with a customer edge (CE) device through the third-party operator network; and a non-transitory computer readable storage medium storing programming for execution by the at least one processor, wherein the UNI is configured to receive an Ethernet-local management interface (E-LMI) packet that is sent by a virtual user network interface (VUNI) set in the service provider network, to convert a unicast destination media access control (DMAC) address in the E-LMI packet into a multicast DMAC address through a network interface device, and to send the E-LMI packet to the CE device that is connected with the UNI through a remote user network interface (RUNI) in the third-party operator network, and wherein the third-party operator network provides a pipeline between the service provider network and a customer edge (CE) device in a customer network, the third-party operator network being separate and distinct from both the service provider network and the customer network;

wherein the VUNI is configured to manage the RUNI, the RUNI being correlated with a specific Ethernet virtual connection (EVC) in the third-party operator network;

wherein the E-LMI packet carries configuration information or fault information of the RUNI that is managed by the VUNI; and wherein, when the E-LMI packet carries fault information of the RUNI that is managed by the VUNI, the E-LMI packet comprises a RUNI summary sub-information element field and a RUNI status sub-information element field.

7. The device according to claim 6, wherein the UNI comprises the network interface device adapted to convert the unicast DMAC address into a multicast DMAC address.

8. A provider edge (PE) device comprising:

at least one processor adapted to function as a virtual user network interface (VUNI), wherein the PE device is located in a service provider network, the service provider network being connected with a customer edge (CE) device through a third-party operator network; and a non-transitory computer readable storage medium storing programming for execution by the at least one processor, wherein the VUNI is configured to set a destination media access control (DMAC) address field in an Ethernet-local management interface (E-LMI) packet to a unicast DMAC address, and to send the E-LMI packet carrying the unicast DMAC address to a remote user network interface (RUNI) in the third-party operator network through a user network interface (UNI) in the third-party operator network, wherein sending the E-LMI packet carrying the unicast DMAC address to the RUNI prompts the RUNI to convert the unicast DMAC address to a multicast DMAC address through a network interface device, and to forward the E-LMI packet carrying the multicast DMAC address to the CE device, and wherein the third-party operator network provides a pipeline between the service provider network and a customer edge (CE) device in a customer network, the third-party operator network being separate and distinct from both the service provider network and the customer network;

wherein the VUNI is configured to manage the RUNI, the RUNI being correlated with a specific Ethernet virtual connection (EVC) in the third-party operator network;

wherein the E-LMI packet carries configuration information or fault information of the RUNI that is managed by the VUNI; and wherein, when the E-LMI packet carries fault information of the RUNI that is managed by the VUNI, the E-LMI packet comprises a RUNI summary sub-information element field and a RUNI status sub-information element field.

9. The device according to claim 8, wherein the VUNI is further configured to obtain the fault information of the RUNI, and to send a connectivity check message (CCM) that carries the fault information of the RUNI to all other PE devices in the service provider network wherein the PE device is located, so that all other PE devices send the fault information of the RUNI to the CE device that is connected with each of the PE devices, and wherein the VUNI is further configured to send the E-LMI packet carrying the fault information of the RUNI that is managed by the VUNI to the CE device connected with the PE device where the VUNI is located.

10. The device according to claim 9, wherein the VUNI is further configured to send the E-LMI packet carrying the fault information of the RUNI to the RUNI managed by the VUNI that is set in the third-party operator network.

11. The device according to claim 9, wherein the third-party operator network is configured to discard incoming E-LMI packets carrying multicast addresses received from the VUNI, and wherein converting the unicast DMAC address to the multicast DMAC address at the RUNI configures the E-LMI packet to be transparently communicated from the third-party operator network to the CE device.

12. The device according to claim 6, wherein the third-party operator network is configured to discard incoming E-LMI packets carrying multicast addresses received from the VUNI.

13. The device according to claim 12, wherein converting the unicast DMAC address to the multicast DMAC address configures the E-LMI packet to be transparently communicated from the third-party operator network to the CE device.

14. The method of claim 1, wherein the third-party operator network is configured to discard incoming E-LMI packets carrying multicast addresses that are received from the VUNI.

15. The method of claim 14, wherein converting the unicast DMAC address to the multicast DMAC address at the RUNI configures the E-LMI packet to be transparently communicated from the third-party operator network to the CE device.

16. The method of claim 3, wherein the third-party operator network is configured to discard incoming E-LMI packets carrying multicast addresses received from the VUNI, and wherein converting the unicast DMAC address to the multicast DMAC address at the RUNI configures the E-LMI packet to be transparently communicated from the third-party operator network to the CE device.

* * * * *